March 4, 1930. T. L. FEENEY ET AL 1,749,577
FIRE PREVENTING MEANS FOR MOTION PICTURE PROJECTING MACHINES
Filed Dec. 11, 1926 2 Sheets-Sheet 1

Patented Mar. 4, 1930

1,749,577

UNITED STATES PATENT OFFICE.

THOMAS LEWIS FEENEY AND HUMBERT GODOY, OF PHILADELPHIA, PENNSYLVANIA, ASSIGNORS, BY MESNE ASSIGNMENTS, TO SENTRY SAFETY CONTROL CORPORATION, OF PHILADELPHIA, PENNSYLVANIA

FIRE-PREVENTING MEANS FOR MOTION-PICTURE-PROJECTING MACHINES

Application filed December 11, 1926. Serial No. 154,095.

This invention relates to means for the prevention of fire hazards upon the failure of a motion picture projection mechanism to advance a film subjected to the heat of an arc light.

The object of the invention is the provision of means operative responsive to a circuit closing device associated with the motor on the projector whereby the stopping of the motor will cause said device to remove the source of current from the projector arc circuit.

A feature of the invention consists in providing for breaking a direct current circuit upon the failure of a source of alternating current.

Another feature resides in arranging for the energization of a circuit closing device and the operation of an alternating current motor under the control of two switching means, and for effectively preventing the projection of a film until both said switching means are in proper position.

A further feature resides in the provision of means for breaking the projecting arc circuit upon the stopping of the projector motor for causes other than the failure of the alternating current source.

Figure 1:
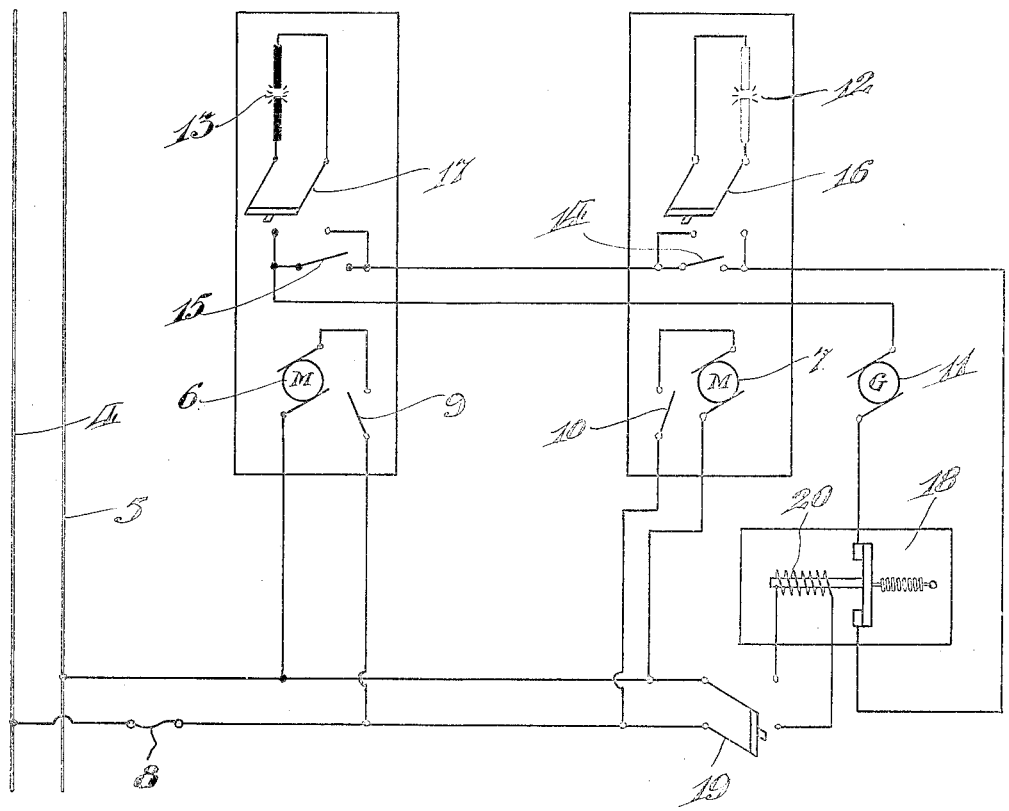
Figure 2:
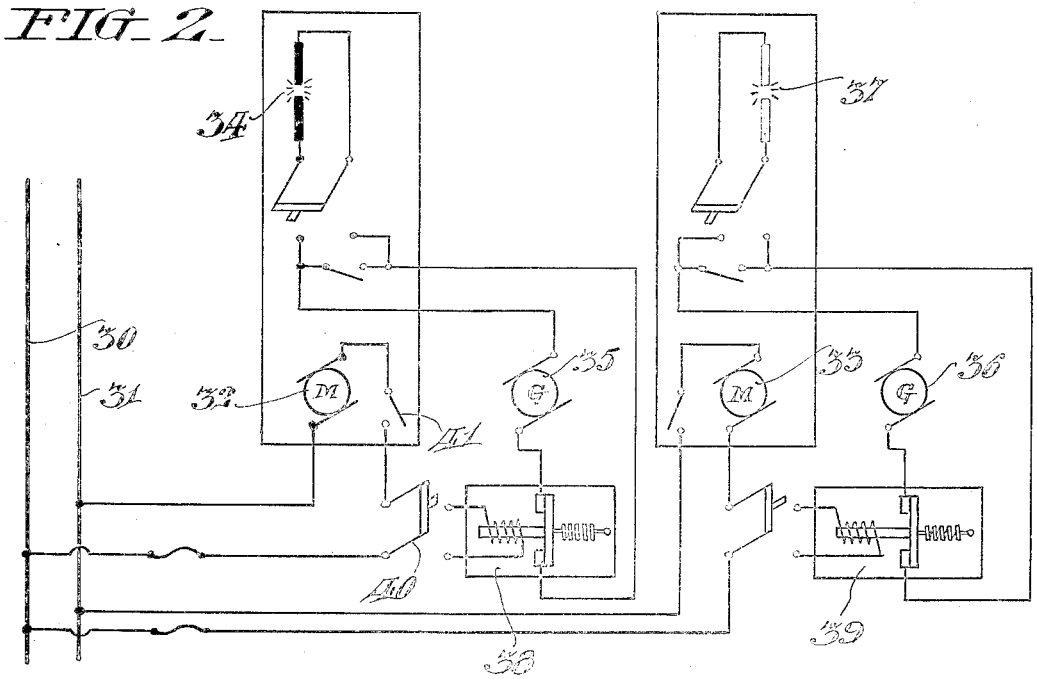
Figure 3:
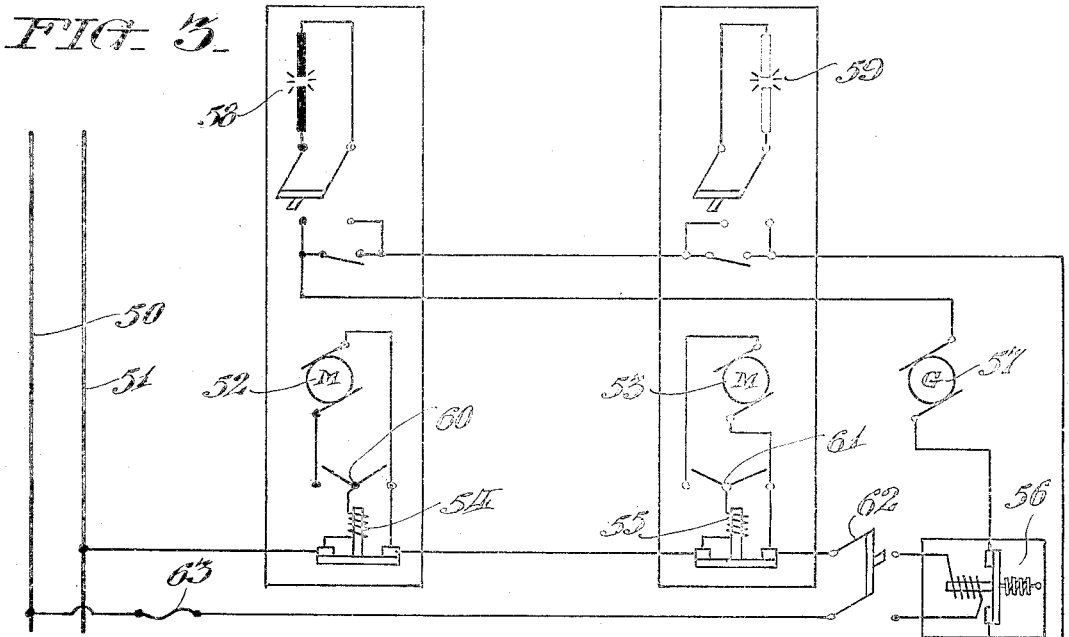

These features, and other advantageous ends which will be described hereinafter, we attain in the following manner, reference being had to the accompanying drawings in which Figure 1 illustrates a circuit incorporating our invention, Figure 2 shows a circuit providing for the breaking of the arc circuit due to failure of a projector motor from causes other than the blowing of a fuse in the alternating current line therefor, and Figure 3 shows another form of circuit arrangement adapted to perform the same function.

Considering Figure 1, numerals 4 and 5 represent transmission lines from an A. C. source for motors 6 and 7. 8 is a fuse in the main line adapted to blow when the line becomes overloaded or for the other well known usual causes. Motors 6 and 7 are connected in parallel to the incoming service and are adapted to be operatively connected by switches 9 and 10. Generator 11 is provided to supply a source of direct current to serve any of a plurality of arcs as 12 and 13 for projecting a film upon a screen. Switches 14 and 15 in the motor generator line for said arcs, are provided to close the arc D. C. circuit, and individual switches 16 and 17 provided respectively for arcs 12 and 13 are used to individually connect any of the arcs as desired. The double set of switches at each projector arc serves as a safeguard, enabling expeditious disconnection of either arc or the line when the film becomes entangled or for any reason the arc must be broken to prevent a fire. Relay 18 is provided to control the generator circuit and will maintain the circuit closed as long as its winding is energized.

The arrangement functions as follows: Upon closing main switch 19, coil 20 will be energized to pull up the armature of the relay to close the generator circuit. Prior to throwing switch 19, the operator will usually close the switch for motor 6 or 7 depending upon which machine is being used, to start the film. The film is thus moving, when the heat of the arc reaches its full intensity.

Should fuse 8 blow, the motor used will stop. Unless the arc were broken, the film, also stopped, would be ignited by the arc. Relay 18, however, will immediately deenergized when the fuse blows out; and the armature will release to automatically break the arc circuit simultaneously with the breaking of the motor circuit.

It is evident from the drawing, that the device operates the same way with either of the machines shown.

Although the greatest cause of motor trouble lies in the blowing of fuses or their accidental removal, when the motor circuits are tapped from a lighting service, as is usual in many theatres, yet, the motor may fail from other causes. It is imperative therefore that means be provided to break the arc circuit every time the motor stops, notwithstanding the cause, in order to effectively prevent fire from the exposure of non-moving films to the heat of the arc.

Figure 2 shows an arrangement in which the arc circuit is broken whenever the motor stops. Numerals 30 and 31 represent A. C. feed lines for motors 32 and 33. Arc 34 is adapted to function with a film controlled by motor 32 and is in circuit with generator 35. A separate generator 36 is provided for arc 37 of the other machine shown. Relay 38 is provided to control the D. C. circuit including generator 35, and relay 39 is provided to control the arc in the other machine. Feed lines in parallel, separately fused, and drawn from lines 30 and 31, serve the machines as shown. The other parts obviously function as in the arrangement of Figure 1 and need not be described.

The arrangements for each machine work identically and hence the one including motor 32, only will be described.

The motor 32 is started by throwing its switch 41 and closing the switch 40 which energizes the relay and closes the generator circuit for arc 34 when the armature of the relay is drawn up to close the same. The arc and film feeding motor are therefore thrown on simultaneously and at this time the dowser must be kept down over the light projecting aperture. The circuit for the relay is: line 31, motor 32, switch 41, through upper terminal of switch 40, winding of the relay, lower terminal of switch 40, the fuse in the line and out to lead 30. In the event the fuse blew out, the motor would stop. Since the relay is in the same circuit, the arc would be broken at the same time. In case the circuit were broken, or a connection either side of the motor came loose, or in the event of a short circuit, the same would hold true. The failure of the motor would be simultaneous with the deenergization of the relay and breaking of the arc. The other machine would not be affected and the performance could go on undisturbed. Since nearly all motion picture theatres have two motor generator sets, this arrangement could be used without necessitating outlay for additonal generator equipment.

In Figure 3 a circuit arrangement adapted to function as in Figure 2, is provided, wherein only one generator set is used. Incoming lines 50 and 51 are connected in series with motors 52 and 53. Relays 54 and 55 are provided to operate respectively with motors 52 and 53 and control make and break device 56 which controls the D. C. circuit including generator 57, provided for arcs 58 and 59. Relay 54 has a switch 60 which is adapted to connect the current either to the motor or to shunt it. Relay 55 functions the same way. In operation, where one machine is used at a time the switch of one relay could be in one position and that of the other in the other position. Assuming that the machine including motor 52 were used, switch 60 would be turned to make contact with the left hand terminal. Switch 61 of relay 55 would be turned to make contact with the right hand terminal. Upon closing main switch 62, the circuit path would be as follows: lead 51, winding of relay 54, left hand terminal of relay 60, motor 52, through relay 55, shunted through right hand terminal of switch 61, upper terminal of switch 62, the winding of relay 56, lower terminal of switch 62, the fuse 63, and out to lead 50. The armature of relay 56 would pull up and close the arc circuit for arc 58, which would be closed by its individual switches as heretofore explained. The same procedure would hold in operating the other machine. Both machines could be operated at the same time by setting both relay switches to the left. This may be necessary in providing a continuous showing of various reels, where two machines are used. If the fuse 63 blew out, or any other trouble took place in the line, on either side of the motor, or in the motor, the armature of relay 54 or of 55 would immediately drop and break the circuit for device 56, which in turn would break the arc circuit.

It should be noted that either motor in Figures 2 or 3 could be cut in and the other stopped without breaking the arc circuit. In Figure 3 the momentary throwing of the switch on each relay would not be sufficient to cause the arc to dull. It is only where the line is broken, not due to the operation of switches 60 or 61 that the relays are designed to drop their armatures. The lag in the relay is not sufficient, however, to delay the breaking of the circuit sufficient to hazard fire from a sustained arc, when the motor stops.

Of course, the circuits illustrated may be modified and changed in various ways without departing from the invention herein set forth and hereafter claimed.

We claim:

1. In a mechanism for motion picture projection, a source of alternating current, a motor and a switch for connecting said motor with said source, a make and break switching device and a second switch for energizing said device in circuit with said source, a direct current generator adapted to be placed in circuit for maintaining an electric arc for projecting a film upon a screen, means operative responsive to said first switch for starting said motor, means including said device operative responsive to said second switch for starting said generator to cause said arc to function, said device being dependent for its energization upon said two switches and said source of alternating current, said generator being instantaneously inoperative upon the deenergization of said device.

2. In a mechanism for projecting a film upon a screen, a plurality of motors, a plurality of means for producing electric arcs for projecting films rotated therebefore by
said motors, means operatively connected
with said means for producing electric arcs
for breaking an arc circuit upon the failure
of an electric motor to continue moving a
reel of film in front of an arc; and means enabling changing from one motor to another
without disturbing the means for producing and maintaining the electric arcs.

In testimony whereof we have signed our
names to this specification.

THOMAS LEWIS FEENEY.
HUMBERT GODOY.